US008774952B2

(12) United States Patent
Kim et al.

(10) Patent No.: US 8,774,952 B2
(45) Date of Patent: Jul. 8, 2014

(54) ADAPTIVE MODE CONTROL APPARATUS AND METHOD FOR ADAPTIVE BEAMFORMING BASED ON DETECTION OF USER DIRECTION SOUND

(75) Inventors: Hyun-Soo Kim, Yongin-si (KR); Hanseok Ko, Seoul (KR); Jounghoon Beh, Seoul (KR); Taekjin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1429 days.

(21) Appl. No.: 12/455,873

(22) Filed: Jun. 9, 2009

(65) Prior Publication Data

US 2009/0304200 A1 Dec. 10, 2009

(30) Foreign Application Priority Data

Jun. 9, 2008 (KR) ........................ 10-2008-0053810

(51) Int. Cl.
*G06F 17/00* (2006.01)

(52) U.S. Cl.
USPC .......................................... 700/94; 381/71.11

(58) Field of Classification Search
USPC ........................................... 381/71.11, 71.12
See application file for complete search history.

(56) References Cited

U.S. PATENT DOCUMENTS

2006/0222184 A1* 10/2006 Buck et al. ................... 381/71.1
2009/0198495 A1* 8/2009 Hata ............................ 704/246
2009/0274318 A1* 11/2009 Ishibashi et al. ................ 381/92

FOREIGN PATENT DOCUMENTS

WO WO 2007138878 A1 * 12/2007
WO WO 2007139040 A1 * 12/2007

OTHER PUBLICATIONS

Yang-Won Jung, Hong-Goo Kang, Chungyong Lee, Dae-Hee Youn, Changkyu Choi, Jaywoo Kim, "Adaptive Microphone Array System with Two-Stage Adaptation Mode Controller," Apr. 2005, IEICE Transactions on Fundamentals of Electronics, Communications and Computer Sciences vol. E88-A No. 4 pp. 972-977.*

C. Segura, A. Abad and Javier Hernando, "Multimodal Person Tracking in a Smart-Room Environment," Nov. 2006, IV Jornadas en Tecnología del Habla, pp. 271-276.*

R. Mukai, H. Sawada, S. Araki, S. Makino, "Frequency Domain Blind Source Separation for Many Speech Signals," 2004, ICA, pp. 461-469.*

* cited by examiner

*Primary Examiner* — Joseph Saunders, Jr.

(57) ABSTRACT

An adaptive mode control apparatus and method for adaptive beamforming based on detection of a user direction sound are provided. The adaptive mode control apparatus includes a signal intensity detector that searches for signal intensity of each designated direction to detect signal intensity having a maximum value when a voice signal of each direction is input through at least one microphone; and an adaptive mode controller that compares the signal intensity having the maximum value detected through the signal intensity detector with a threshold value and determines whether to perform an adaptive mode of a Generalized Sidelobe Canceller (GSC) according to the comparison results. Therefore, a lack of control of adaptation of an adaptive filter of the conventional art is solved. That is, as one condition for guaranteeing performance of adaptive beamforming, adaptation of an adaptive filter is not performed when noise of a sound with a high autocorrelation is cancelled.

20 Claims, 6 Drawing Sheets

ADAPTIVE MODE CONTROL APPARATUS AND METHOD FOR ADAPTIVE BEAMFORMING BASED ON DETECTION OF USER DIRECTION SOUND

CROSS-REFERENCE TO RELATED APPLICATION(S) AND CLAIM OF PRIORITY

The present application claims priority under 35 U.S.C. §119(a) to an application entitled "ADAPTIVE MODE CONTROL APPARATUS AND METHOD FOR ADAPTIVE BEAMFORMING BASED ON DETECTION OF USER DIRECTION SOUND" filed in the Korean Intellectual Property Office on Jun. 9, 2008 and assigned Serial No. 10-2008-0053810, the contents of which are incorporated herein by reference.

TECHNICAL FIELD OF THE INVENTION

The present invention relates to adaptive beamforming, and more particularly, to adaptive mode control for noise cancellation.

BACKGROUND OF THE INVENTION

Adaptive beamforming is a technology in which sounds other than a voice are suppressed by radiating an acoustic beam in a direction in which a user's voice is output.

Conventional noise canceling techniques using a microphone array include a first method using a correlation between signals input to microphones of a microphone array and a second method using an energy ratio between a target signal and a reference signal.

A conventional noise canceling system using a microphone array includes at least one microphone, a short-term analyzer connected to each microphone, an echo canceller, an adaptive beamforming processor that cancels directional noise and turns a filter weight update on or off based on whether or not a front sound exists, a front sound detector that detects a front sound using a correlation between signals of microphones, a post-filtering unit that cancels remaining noise based on whether or not a front sound exists, and an overlap-add processor.

In the conventional noise canceling system and method using the microphone array, an adaptive filter of a Generalized Sidelobe Canceller (GSC) cannot properly adapt when a position of directional noise changes or burst noise having large energy occurs. This is due to a difficulty in tracking variation of noise.

Also, when a noise source has a high autocorrelation, such as a human voice, adaptation performance of the adaptive filter also deteriorates and a noise remains.

The first method using correlation has a problem in that it cannot be used in an actual environment because, when noise of a direction that has to be canceled is colored noise with a high autocorrelation, such as music or a television sound, performance deteriorates.

The second method is not suitable for an actual environment either since performance deteriorates as a signal to noise ratio (SNR) is reduced.

SUMMARY OF THE INVENTION

To address the above-discussed deficiencies of the prior art, it is a primary object to provide an adaptive mode control apparatus and method for adaptive beamforming based on detection of a user direction sound that improves performance of a noise canceling technique using adaptive beamforming by improving performance of an adaptive mode control unit.

The present invention is also directed to reconstructing a user's voice Si(k,l) by estimating Hi(k,l) to remove Yi(k,l) and using adaptive beamforming to remove Ni(k, l).

A first aspect of the present invention provides an adaptive mode control apparatus for adaptive beamforming based on detection of a user direction sound, including: a signal intensity detector that searches for signal intensity of each designated direction to detect signal intensity having a maximum value when a voice signal of each direction is input through at least one microphone; and an adaptive mode controller that compares the signal intensity having the maximum value detected through the signal intensity detector with a threshold value and determines whether to perform an adaptive mode of a Generalized Sidelobe Canceller (GSC) according to the comparison results.

The signal intensity detector may include: a window processor that applies a Hanning window of a predetermined length to a voice having noise input to each microphone of a microphone array to be divided into frames; a Discrete Fourier Transform (DFT) processor that performs a DFT for each microphone and each frame for frequency analysis of the frames divided by the window processor; a correlation computer that steers a beam in a detection direction in pairs of microphones which configures the microphone array and estimates a cross-power spectrum; a weight estimator that computes a phase-transform weight for normalizing a cross-power spectrum from a frame output through the DFT processor; and a signal intensity measuring unit that measures intensity of a sound input from a microphone which configures the microphone array from a corresponding direction for detecting a voice signal.

A second aspect of the present invention provides an adaptive mode control method for adaptive beamforming based on detection of a user direction sound, comprising: searching for signal intensity of each designated direction to detect signal intensity having a maximum value when an array input signal input through at least one microphone that is provided to a fixed beamformer and a signal blocking unit is received; and comparing the detected signal intensity having the maximum value with a threshold value and determining whether to perform an adaptive mode of a GSC according to the comparison results.

Searching for signal intensity of each designated direction may include: at a window processor, applying a Hanning window of a predetermined length to a voice having noise input to each microphone of a microphone array to be divided into frames; at a DFT processor, performing a DFT for each microphone and each frame for frequency analysis; at a correlation computer, steering a beam in a detection direction in pairs of microphones which configure the microphone array and estimating a cross-power spectrum; a weight estimator, computing a phase-transform weight for normalizing a cross-power spectrum from the frame output through the DFT processor; and measuring intensity of a sound input through the microphones which configure the microphone array from a corresponding direction when the directions of the microphones which configure the microphone array are searched.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

One condition for improving performance of adaptive beamforming is that adaptation of an adaptive filter used in adaptive beamforming be stopped when a user speaks. This is determined by adaptive mode control.

Figure 1:
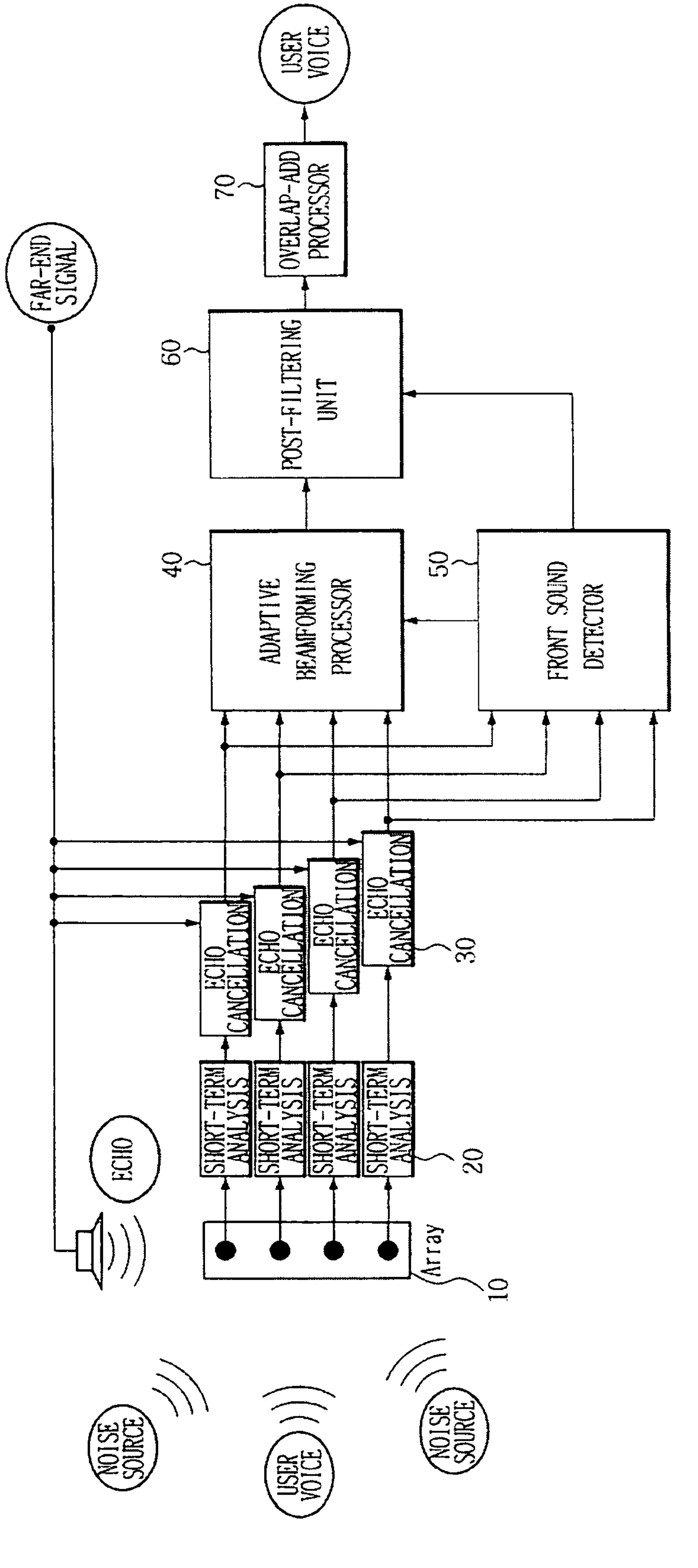
FIG. 1 illustrates a block diagram of a directional noise canceling system using a microphone array.

FIG. 1 illustrates a block diagram of a directional noise canceling system using a microphone array. The noise canceling system includes at least one microphone 10, a short-term analyzer 20 connected to each microphone, an echo canceller 30, an adaptive beamforming processor 40 that cancels directional noise and turns a filter weight update on or off based on whether or not a front sound exists, a front sound detector 50 that detects a front sound using a correlation between signals of microphones, a post-filtering unit 60 that cancels remaining noise based on whether or not a front sound exists, and an overlap-add processor 70.

Table 1 shows notations and definitions that will be used in the below description.

TABLE 1

| Usage | Notation | Definition | notation | definition |
|---|---|---|---|---|
| Common | k | discrete frequency index | N | noise |
| | m | discrete time index | $\Phi_{AB}$ | cross-power spectrum of A and B |
| | l | frame index | μ | forgetting factor |
| | i | microphone index | ^ | estimation value, for example, $\hat{S}$ is an estimated voice |
| | * | conjugate | w | window function |
| | Z | input signal | SNR | signal-to-noise ratio |
| | Y | echo | SER | signal-to-echo ratio |
| | H | echo path transfer function | DFT | discrete Fourier transform |
| | X | far-end signal | FFT | fast Fourier transform |
| | S | voice | LMS | least mean square |
| Echo cancellation | $Z^{aec}$ | echo-canceled signal | $P^{far}$ | short-term power of far-end signal |
| | η | double-talk detection measure | | |
| Adaptive beamforming | $Z^{fb}$ | fixed beamformer output | E | error signal |
| | $Z^{sb}$ | signal blocking output | $P^{gsc}$ | power spectrum of reference noise |
| | $Z^{gsc}$ | adaptive beamformer output | A | signal path transfer function |
| Front sound detection | $P^{srp}$ | power of front sound | | |
| Post-filtering | ξ | a priori SNR | $\lambda_S$ | voice power-spectrum |
| | γ | a posteriori SNR | $\lambda_N$ | noise power-spectrum |

Although the system in FIG. 1 illustrates at least one microphone 10, that the following examples utilize four microphones 10 in the system. A signal input to each microphone can be expressed by Equation 1:

$$Z_i(k,l)=Y_i(k,l)+N_i(k,l), i=1 \ldots 4 \quad \text{[Eqn. 1]}$$

where Z denotes an input signal, Y denotes an echo, N denotes noise, i denotes a microphone index, k denotes a discrete frequency index, and l denotes a frame index.

An echo Yi(k, l) is input to each of the four microphones 10 through each echo path $H_i(k)$, and an echo signal input to each microphone can be expressed by Equation 2:

$$Y_i(k,l)=H_i(k)X(k,l), i=1 \ldots 4 \quad \text{[Eqn. 2]}$$

where Y denotes an echo, H denotes an echo path transfer function, X denotes a far-end signal, i denotes a microphone index, k denotes a discrete frequency index, and l denotes a frame index.

Here, it is assumed that X(k, l) and N(k, l) are related to each other in Equation 1 and Equation 2.

Frequency domain analysis for voices input to each microphone 10 is performed through the short-term analyzer 20.

For example, one frame corresponds to 256 milliseconds (ms), and a movement section is 128 ms. Therefore, 256 ms is sampled into 4,096 at 16 Kilohertz (Khz).

When a Hanning window is applied, Equation 3 can be used.

A Hanning window is applied to perform modeling of an echo path impulse response.

In the event that a length of an echo path impulse response is longer than 128, which is half of a frame size, an echo path is not properly estimated, leading to voice reconstruction performance deterioration. voice reconstruction performance deterioration occurs because all filters in use perform filtering in the frequency domain, and it is regarded as circular convolution in the time domain.

$$w(m) = 0.5\left(1 - \cos\left(2\pi \frac{m}{M}\right)\right), \quad u \le m < M \qquad \text{[Eqn. 3]}$$

where w denotes a window function, M denotes the number of samples that configure a frame, and m denotes a discrete time index.

That is, if it is assumed that the number of samples of a movement section is T, an input signal of an $I^{th}$ frame and a frequency-domain signal of a far-end signal can be expressed by Equation 4 and Equation 5, respectively, using a window of Equation 3 and a DFT.

$$Z_i(k, l) = \sum_{m=0}^{M-1} w(m) z_i(l(M-T)+m)) e^{-j\frac{2\pi}{M}mk}, \quad 0 \le k < M, \quad i = 1, \ldots, 4 \qquad \text{[Eqn. 4]}$$

where Z denotes an input signal, i denotes a microphone index, k denotes a discrete frequency index, l denotes a frame index, w denotes a window function, M denotes the number of samples which configure a frame, and m denotes a discrete time index.

$$X(k, l) = \sum_{m=0}^{M-1} w(m) x(l(M-T)+m)) e^{-j\frac{2\pi}{M}mk}, \quad 0 \le k < M, \qquad \text{[Eqn. 5]}$$

where X denotes a far-end signal, k denotes a discrete frequency index, l denotes a frame index, w denotes a window function, M denotes the number of samples which configure a frame, and m denotes a discrete time index.

Thereafter, a DFT is performed using a real Fast Fourier Transform (FFT), and an ETSI standard feature extraction program is used as a source code.

Here, M=4,096, and an order of the FFT is identical to M.

That is, when it is assumed that a user's voice signal, which is reconstructed by canceling an echo and noise using Equation 4 and Equation 5, is $\hat{S}(k,l)$, this signal is reconstructed as a time-domain signal again as in Equation 6 through an inverse real FFT.

$$\hat{s}(l(M-T)+m) = \sum_{m=0}^{M-1} \hat{S}(k \cdot l) e^{-j\frac{2\pi}{M}mk}, \quad 0 \le m < M \qquad \text{[Eqn. 6]}$$

where $\hat{S}$ denotes an estimated voice, S denotes a voice, k denotes a discrete frequency index, l denotes a frame index, M denotes the number of samples which configure a frame, and m denotes a discrete time index.

The reconstructed signal is shown in the form to which a window is applied, and reconstructed signals of frames are overlapped by a movement section and added. That is, T samples are reconstructed using reconstructed signals of an $I^{th}$ frame and a $(I+1)^{th}$ frame and can be expressed as in Equation 7:

$$\hat{s}(m) = \hat{s}(l(M-T)+m+T) + \hat{s}((l+1)(M+T)+m), \quad 0 \le m < T \qquad \text{[Eqn. 7]}$$

where $\hat{S}$ denotes an estimated voice, S denotes a voice, k denotes a discrete frequency index, l denotes a frame index, M denotes the number of samples which configure a frame, and m denotes a discrete time index.

Signal values of a corresponding section can be reconstructed to an original signal by adding signals, which correspond to an overlapping section, using the above-described method as shown in FIGS. 2A to 2E.

Figure 2A:
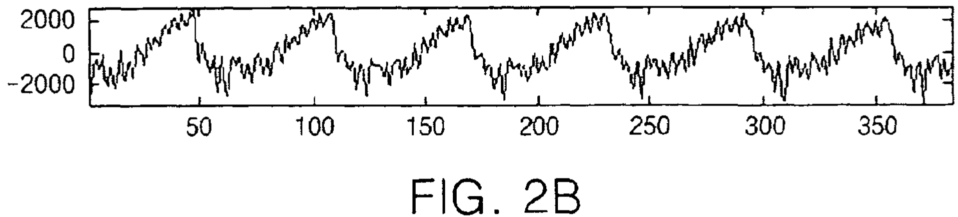
FIGS. 2A through 2E illustrate views of signals of respective sections in the directional noise canceling system using a microphone array shown in FIG. 1.
Figure 2B:
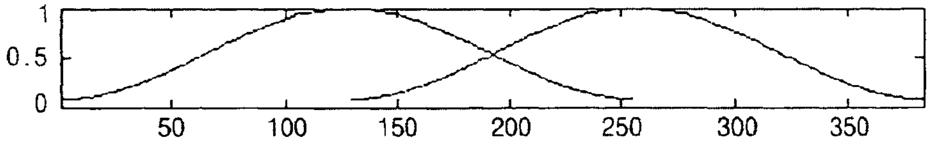
Figure 2C:
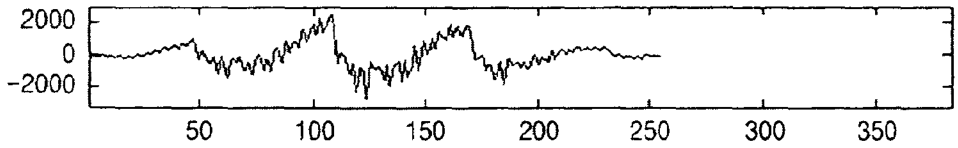
Figure 2D:
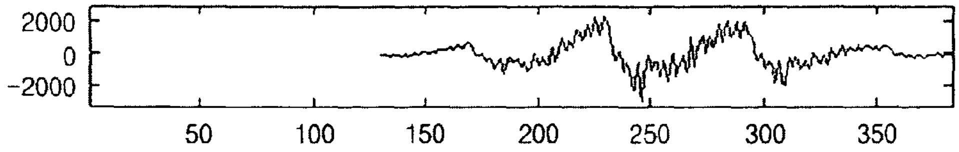
Figure 2E:
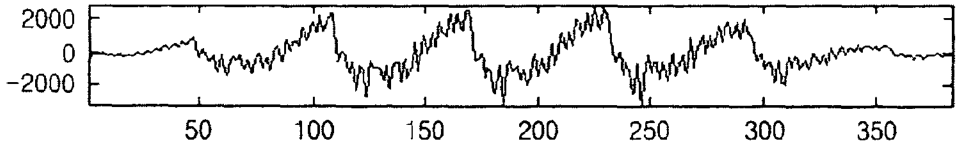

FIG. 2A shows an original signal, FIG. 2B shows a window, FIG. 2C shows a first frame signal, FIG. 2D shows a second frame signal, and FIG. 2E shows a reconstructed signal.

As described above, input signals are processed in units of frames and reconstructed.

Directional noise is canceled from a signal in which an echo is canceled through the adaptive beamforming processor 40.

Figure 3:
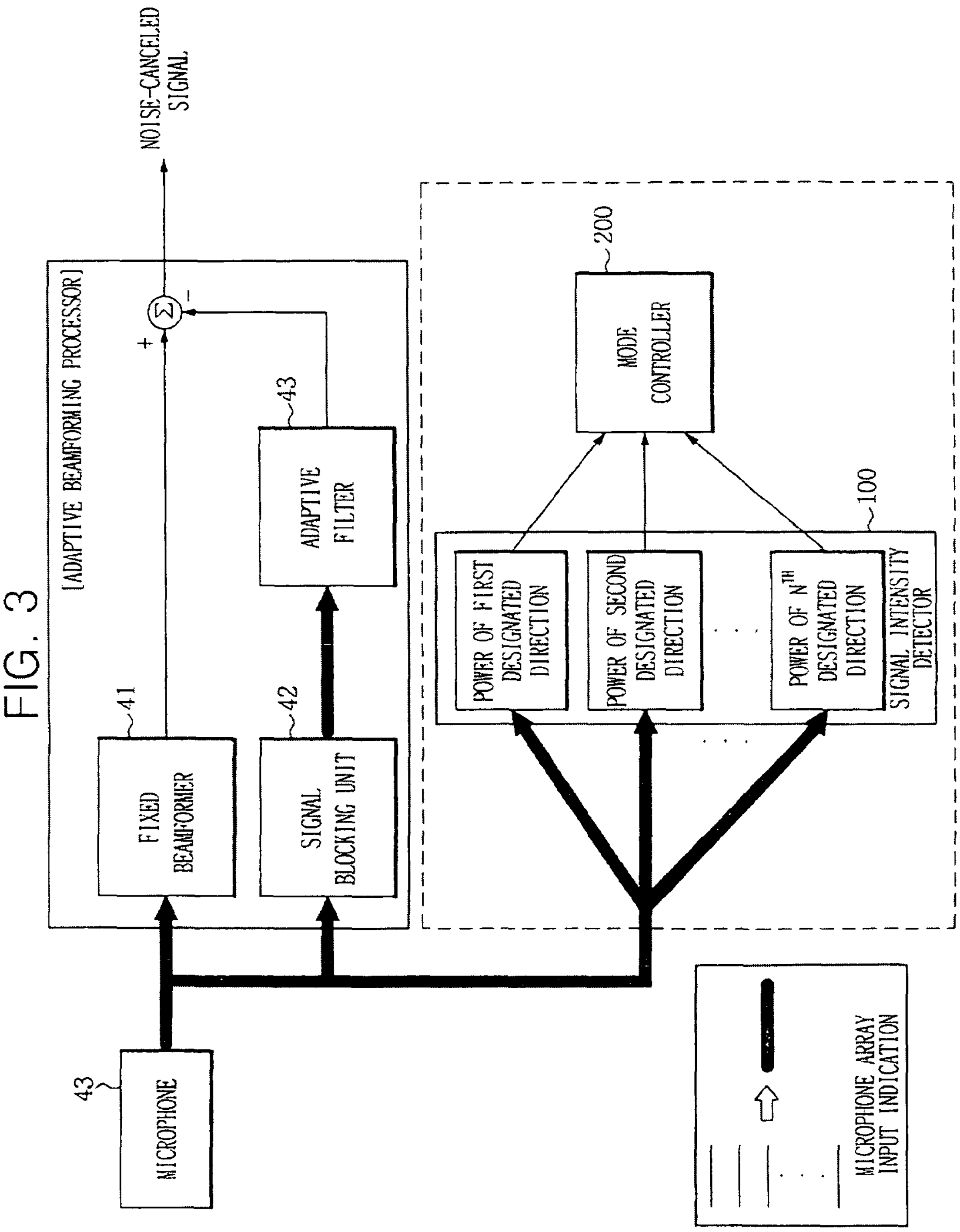
FIG. 3 illustrates a functional block diagram of an adaptive mode control apparatus for adaptive beamforming based on detection of a user direction sound according to an exemplary embodiment of the present invention.

The adaptive beamforming processor 40 uses a GSC. The GSC includes a fixed beamformer 41, a signal blocking unit 42, an adaptive filter 43, and an interference canceller 44 as shown in FIG. 3.

The fixed beamformer 41 steers the microphone array to a user direction (e.g., the front). That is, since a voice is input from the front, and there is no delay between voice signals input to microphones, an average value of echo-cancelled signals is obtained as in Equation 8:

$$Z^{fb}(k, l) = \frac{1}{4}\sum_{i=1}^{4} Z_i^{aec}(k \cdot l) \qquad \text{[Eqn. 8]}$$

where $Z^{fb}$ denotes a fixed beamformer output, k denotes a discrete frequency index, l denotes a frame index, $Z^{aec}$ denotes an echo-canceled signal, and i denotes a microphone index.

The signal blocking unit 42 computes side-lobe noise through Equation 9, such that a front sound is canceled, and only noise is acquired. Here, a front direction is referred to as a main-lobe, and any other direction is referred to as a side-lobe.

$$\begin{bmatrix} Z_1^{sb}(k,l) \\ Z_2^{sb}(k,l) \\ Z_3^{sb}(k,l) \end{bmatrix} = \begin{bmatrix} 1 & -1 & 0 & 0 \\ 0 & 1 & -1 & 0 \\ 0 & 0 & 1 & -1 \end{bmatrix} \begin{bmatrix} Z_1^{aec}(k,l) \\ Z_2^{aec}(k,l) \\ Z_3^{aec}(k,l) \\ Z_4^{aec}(k,l) \end{bmatrix} \quad \text{[Eqn. 9]}$$

where $Z^{sb}$ is a signal blocking output, $Z^{aec}$ an echo-canceled signal, k denotes a discrete frequency index, and l denotes a frame index.

In some embodiments, the noise occurring from the side-lobe is input to the microphone array after undergoing a spatial path transfer function that is A(k, l).

The adaptive filter 43 adaptively estimates A(k, l) and cancels directional noise using $Z^{sb}$ acquired through Equation 9.

This is similar to a method of estimating a path in which a far-end signal arrives at an array from a speaker to cancel an echo. Here, since microphones have different characteristics, a user's voice slightly remains in the result of Equation 9.

Therefore, when a user's voice is present, adaptation is not performed.

Whether or not to perform adaptation is determined through detection of a front sound.

As an adaptation method, a frequency-domain normalized Least Means Square (LMS) is implemented by applying a complex LMS through Equations 10, 11 and 12:

$$\hat{A}_i(k,l+1) = \hat{A}_i(k,l) + (1-\mu)\frac{\xi(k,l)Z_i^*(k,l)}{P^{gsc}(k,l)} \quad \text{[Eqn. 10]}$$

where A denotes a spatial path transfer function, ˆ denotes an estimation value, ξ denotes a priori SNR, k denotes a discrete frequency index, l denotes a frame index, μ denotes a forgetting factor, Z denotes an input signal, * denotes a conjugate, i denotes a microphone index, and $P^{gsc}$ denotes a short-terminal power of a far-end signal.

$$P^{gsc}(k,l) = \mu P^{gsc}(k,l-1) + (1-\mu)\sum_{i=1}^{3}|Z_i^{sb}(k\cdot l)|^2 \quad \text{[Eqn. 11]}$$

where $P^{gsc}$ denotes a short-terminal power of a far-end signal, k denotes a discrete frequency index, l denotes a frame index, μ denotes a forgetting factor, $Z^{sb}$ denotes a signal blocking output, and i denotes a microphone index.

$$E(k,l) = Z^{fb}(k,l) - \sum_{i=1}^{3}\hat{A}_i(k\cdot l)Z_i^{sb}(k,l) \quad \text{[Eqn. 12]}$$

where E denotes an error signal, $Z^{fb}$ denotes a fixed beamformer output, k denotes a discrete frequency index, l denotes a frame index, A denotes a spatial path transfer function, ˆ denotes an estimation value, ξ denotes a priori SNR, and $Z^{sb}$ denotes a signal blocking output.

Thereafter, interference is canceled as in Equation 13:

$$Z^{gsc}(k,l) = \xi(k,l) = Z^{fb}(k,l) - \sum_{i=1}^{3}\hat{A}_i(k\cdot l)Z_i^{sb}(k,l) \quad \text{[Eqn. 13]}$$

To detect a front sound, power of a sound input from a front direction is obtained using a Steered Response Power Phase Transform (SRP-PHAT). A signal of each microphone 10 in which an echo is canceled is obtained by Equation 14.

$$P^{srp}(l) = \frac{1}{M/2-1}\sum_{i=1}^{4}\sum_{j-i}^{4}\sum_{k-1}^{M/2-1}\frac{\Phi_{Z_i^{aec}Z_j^{aec}}(k,l)}{|\Phi_{Z_i^{aec}Z_j^{aec}}(k,l)|} \quad \text{[Eqn. 14]}$$

$$\Phi_{Z_i^{aec}Z_j^{aec}}(k,l) = (1-\mu)\Phi_{Z_i^{aec}Z_j^{aec}}(k,l-1) + \mu Z_i^{aec}(k,l)Z_j^{aec}(k,l)^*$$

where $p^{srp}$ denotes a power of a front sound, $\Phi_{AB}$ denotes a cross-power spectrum of A and B, $Z^{aec}$ denotes an echo-canceled signal, k denotes a discrete frequency index, l denotes a frame index, and $P^{srp}(l)$ has values of 1 to 6.

It is determined by Equation 15 whether or not a front sound exists by comparing a value of $P^{srp}(l)$ with a predetermined threshold value.

$$Flag^{srp}(l) = \begin{cases} 1, & \text{if } P^{srp}(l) < TH^{srp} \\ 0, & \text{elsewhere} \end{cases} \quad \text{[Eqn. 15]}$$

Here, $TH^{srp}$ is set to 1 and may change depending on an environment.

Here, the environment refers to, for example, a reverberant space in which the inventive technique is used.

A SRP-PHAT value is normalized to a magnitude and thus has a large value even when a small sound occurs from a front direction.

Therefore, in order to more stably obtain a front sound, output log power of the GSC is obtained and compared with a predetermined threshold value to detect a front sound using Equations 16.

$$Flag^{out}(l) = \begin{cases} 1, & \text{if } P^{out}(l) < TH^{out} \\ 0, & \text{elsewhere} \end{cases} \quad \text{[Eqn. 16]}$$

$$P^{out}(l) = \log\left(\frac{1}{M/2-1}\sum_{k-1}^{M/2-1}|Z^{gsc}(k,l)|^2\right)$$

where $Z^{gsc}$ denotes an adaptive beamformer output, and $P^{out}$ denotes output power.

$TH^{out}$ is defined as in Equations 16 but may change depending on an environment.

Here, the environment refers to a distance between an arrayed microphone and a speaker when the inventive technique is used.

$$Flag^{usr}(l) = \begin{cases} 1, & \text{if } Flag^{out}(l) = 1 \text{ and } Flag^{out}(l) = 1 \\ 0, & \text{elsewhere} \end{cases} \quad \text{[Eqn. 17]}$$

Since beamforming performance deteriorates in the reverberant environment and burst noise or remaining noise occurs, a post filter is additionally used in order to further reduce remaining noise occurring in the above-described situation. The post filter is applied to a signal that has gone through the GSC.

The post filter is based on a Minimum Mean Square Estimation of Log-Spectral Amplitude (MMSE-LSA).

$$G_{lsa}(k,l)=\frac{\xi(k,l)}{1+\xi(k,l)}\exp\left(\frac{1}{2}\int_{\upsilon(k,l)}^{\infty}\frac{e^{-x}}{\tau}d\tau\right) \quad \text{[Eqn. 18]}$$

where ξ denotes a priori SNR, k denotes a discrete frequency index, and l denotes a frame index.

$$\xi(k,l)\equiv\frac{\lambda_S(k,l)}{\lambda_N(k,l)},\quad \text{[Eqn. 19]}$$

$$\gamma(l,k)\equiv\frac{|Z^{gsc}(l,k)|^2}{\lambda_N(l,k)},$$

$$\upsilon(l,k)\equiv\frac{\gamma(l,k)\xi(l,k)}{1+\xi(l,k)}\ldots$$

where ξ denotes a priori SNR, k denotes a discrete frequency index, l denotes a frame index, $\lambda_s$ denotes a voice power-spectrum, $\lambda_N$ denotes a noise power-spectrum, γ denotes a posteriori SNR, μ denotes a forgetting factor.

$\lambda_N(l, k)$ in Equations 19 and 20 is estimated as in Equation 20:

$$\hat{\lambda}_N(l,k)=\begin{cases}\mu\lambda_N(k,l-1)+(1-\mu)\left|\hat{Z}^{gsc}(k,l)\right|^2, & \text{if } Flag^{usr}(l)=0\\ \hat{\lambda}_N(k,l-1), & \text{elsewhere}\end{cases} \quad \text{[Eqn. 20]}$$

where $\lambda_N$ denotes a noise power-spectrum, k denotes a discrete frequency index, l denotes a frame index, μ denotes a forgetting factor, and $Z^{gsc}$ denotes an adaptive beamformer output.

Since it is difficult to estimate $\lambda_s(l, k)$, instead, ξ(k,l) is estimated as in Equation 21:

$$\xi(k,l)=(1-\mu)G_{lsa}^{2}(k,l-1)\gamma(k,l-1)+\mu\max\{\gamma(k,l)-1,0\} \quad \text{[Eqn. 21]}$$

ξ denotes a priori SNR, k denotes a discrete frequency index, l denotes a frame index, γ denotes a posteriori SNR, and μ denotes a forgetting factor.

$G_{lsa}(k, l)$ and a final gain are computed and applied to a signal output from the GSC to thereby obtain a voice signal in which an echo and noise are canceled as in Equations 22:

$$G(k,l)=\begin{cases}0.0001, & \text{if } Flag^{usr}(l)=0 \text{ and } \gamma(k,l)>2\\ G_{lsa}(k,l), & \text{elsewhere}\end{cases} \quad \text{[Eqn. 22]}$$

$$\hat{S}(k,l)=G(k,l)Z^{gsc}(k,l)$$

where S denotes a voice, ^ denotes an estimation value, k denotes a discrete frequency index, and l denotes a frame index.

Referring to Equations 22, when burst noise occurs, G(k,l) is determined as a small value pf 0.0001

Here, burst noise means a case in which a posteriori SNR g(k, l) value is large even though a front sound is not detected. That is, a loud sound is coming from an angle other than a user direction.

FIG. 3 is a block diagram of an adaptive mode control apparatus for adaptive beamforming based on detection of a user direction sound according to an exemplary embodiment of the present invention. An adaptive mode control apparatus for adaptive beamforming based on detection of a user direction sound according to an exemplary embodiment of the present invention includes a signal intensity detector 100 and an adaptive mode controller 200.

Figure 4:
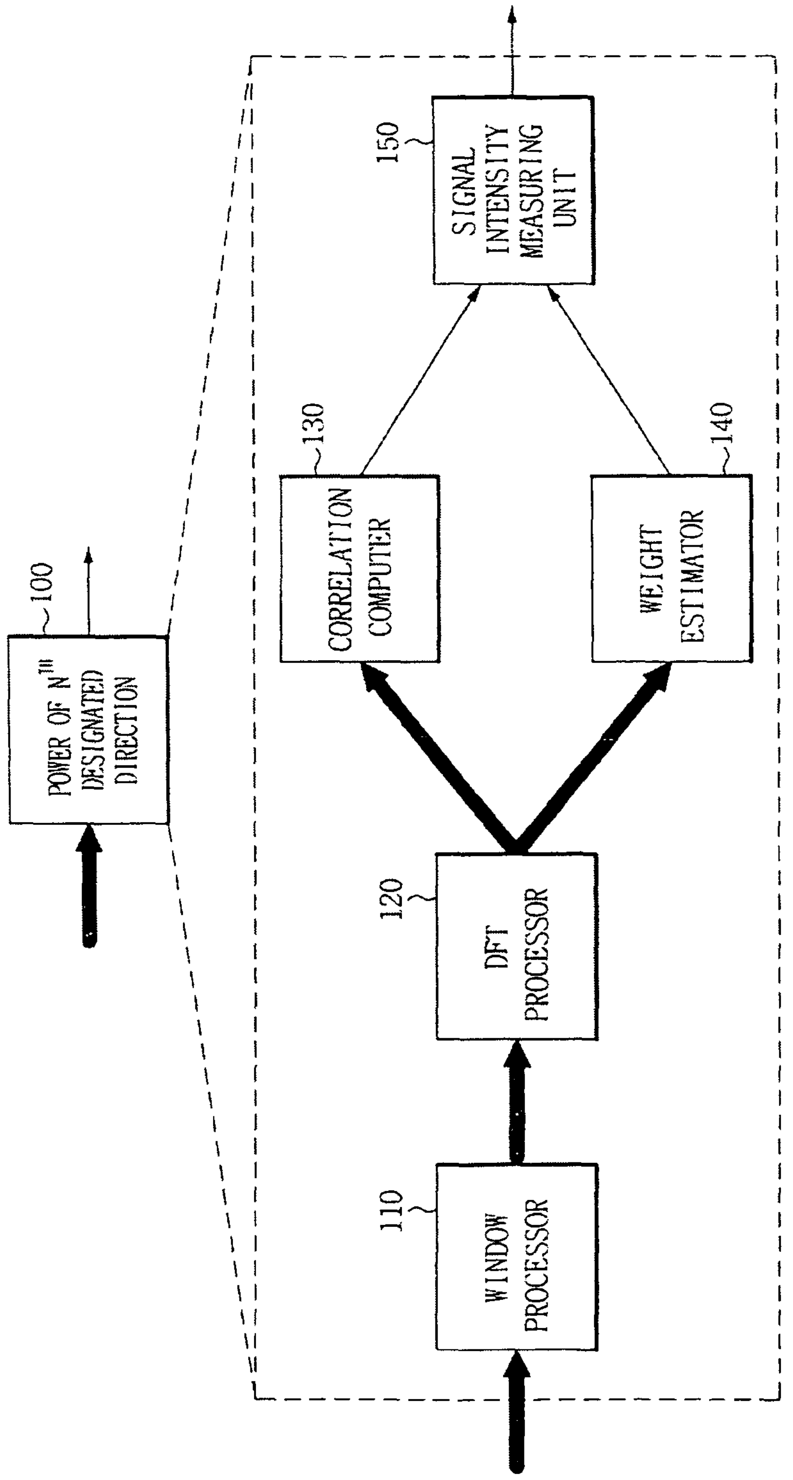
FIG. 4 illustrates a functional block diagram of a signal intensity detector of an adaptive mode control apparatus for adaptive beamforming based on detection of a user direction sound according to an exemplary embodiment of the present invention.

The signal intensity detector 100 receives an array input signal that is input through at least one microphone 10 and provided to the adaptive beamforming processor 40 that includes the fixed beamformer 41, the signal blocking unit 42 and the adaptive filter 43 and searches signal intensity of each designated direction to detect signal intensity having a maximum value. The signal intensity detector 100 includes a window processor 110, a DFT processor 120, a correlation computer 130, a weight estimator 140, and a signal intensity measuring unit 150 as shown in FIG. 4.

The window processor 110 of the signal intensity detector 100 applies a Hanning window of a predetermined length to a voice having noise input through each microphone and divides it into frames.

The DFT processor 120 of the signal intensity detector 100 performs a DFT for each microphone 10 and each frame for frequency analysis.

The correlation computer 130 of the signal intensity detector 100 steers a beam in a detection direction in pairs of microphones that configure the microphone array and then estimates a cross-power spectrum.

The weight estimator 140 of the signal intensity detector 100 obtains a phase-transform weight for normalizing a cross-power spectrum.

When a direction is searched, the signal intensity measuring unit 150 of the signal intensity detector 100 measures intensity of a sound input from a corresponding direction.

The adaptive mode controller 200 compares signal intensity having a maximum value detected by the signal intensity detector 100 with a threshold value and inhibits an adaptive mode of the GSC when signal intensity having the maximum value exceeds the threshold value.

General functions and detailed operation of the respective components are not described here, and their operation will be described focusing on operation related to the present invention.

First, for an array input signal input through the microphone 10, the short-term analyzer 20 and the echo canceller 30, generalized sidelobe canceling is performed through the adaptive beamforming processor 40 that includes the fixed beamformer 41, the signal blocking unit 42 and the adaptive filter 43.

An array input signal input to the adaptive beamforming processor 40 is also input to the signal intensity detector 100.

The window processor of the signal intensity detector 100 applies a Hanning window of a predetermined length to a voice having noise input to each microphone and divides it into frames.

The DFT processor 120 of the signal intensity detector 100 performs a DFT for each microphone 10 and each frame for frequency analysis.

The correlation computer 130 of the signal intensity detector 100 steers a beam in a detection direction in pairs of microphones which configure the microphone array and then estimates a cross-power spectrum.

The weight estimator 140 of the signal intensity detector 100 obtains a phase-transform weight for normalizing a cross-power spectrum.

When a direction is searched, the signal intensity measuring unit 150 of the signal intensity detector 100 measures intensity of a sound input from a corresponding direction.

When signal intensity of each direction is measured through the signal intensity measuring unit 150, the adaptive mode controller 200 compares signal intensity having a maximum value detected by the signal intensity detector 100 with a threshold value and inhibits the adaptive beamforming processor 40 from performing an adaptive mode of the GSC when the signal intensity having the maximum value exceeds the threshold value which is previously set.

However, when the signal intensity having the maximum value does not exceed the threshold value, the adaptive mode of the GSC is performed as in the conventional art.

Figure 5:
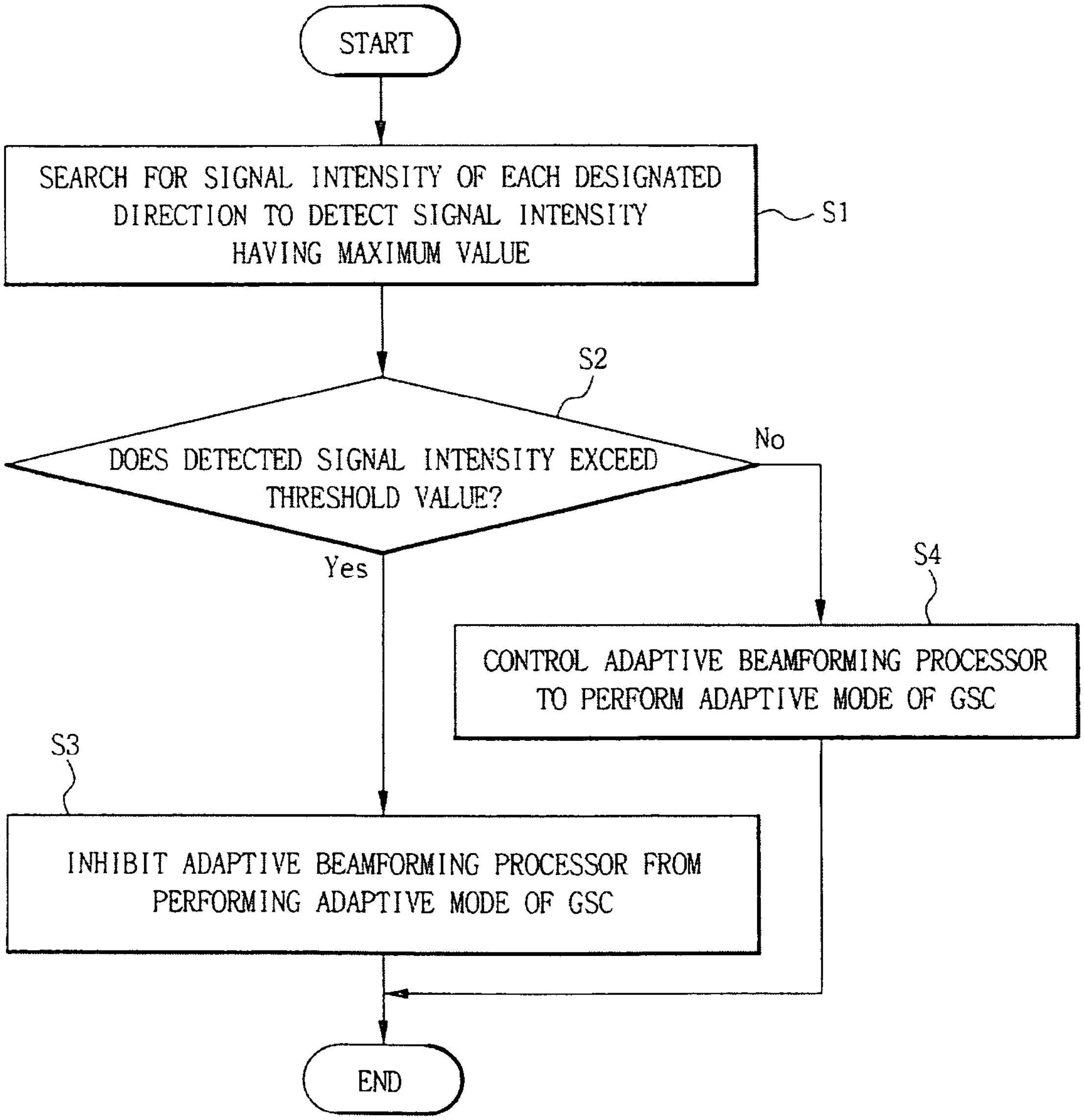
FIG. 5 illustrates a flowchart for an adaptive mode control method for adaptive beamforming based on detection of a user direction sound according to an exemplary embodiment of the present invention.

An adaptive mode control method for adaptive beamforming based on detection of a user direction sound according to an exemplary embodiment of the present invention will be described with reference to FIG. 5.

First, when an array input signal that is provided to the adaptive beamforming processor 40 is received, signal intensity of each designated direction is searched to detect signal intensity having a maximum value (S1).

Figure 6:
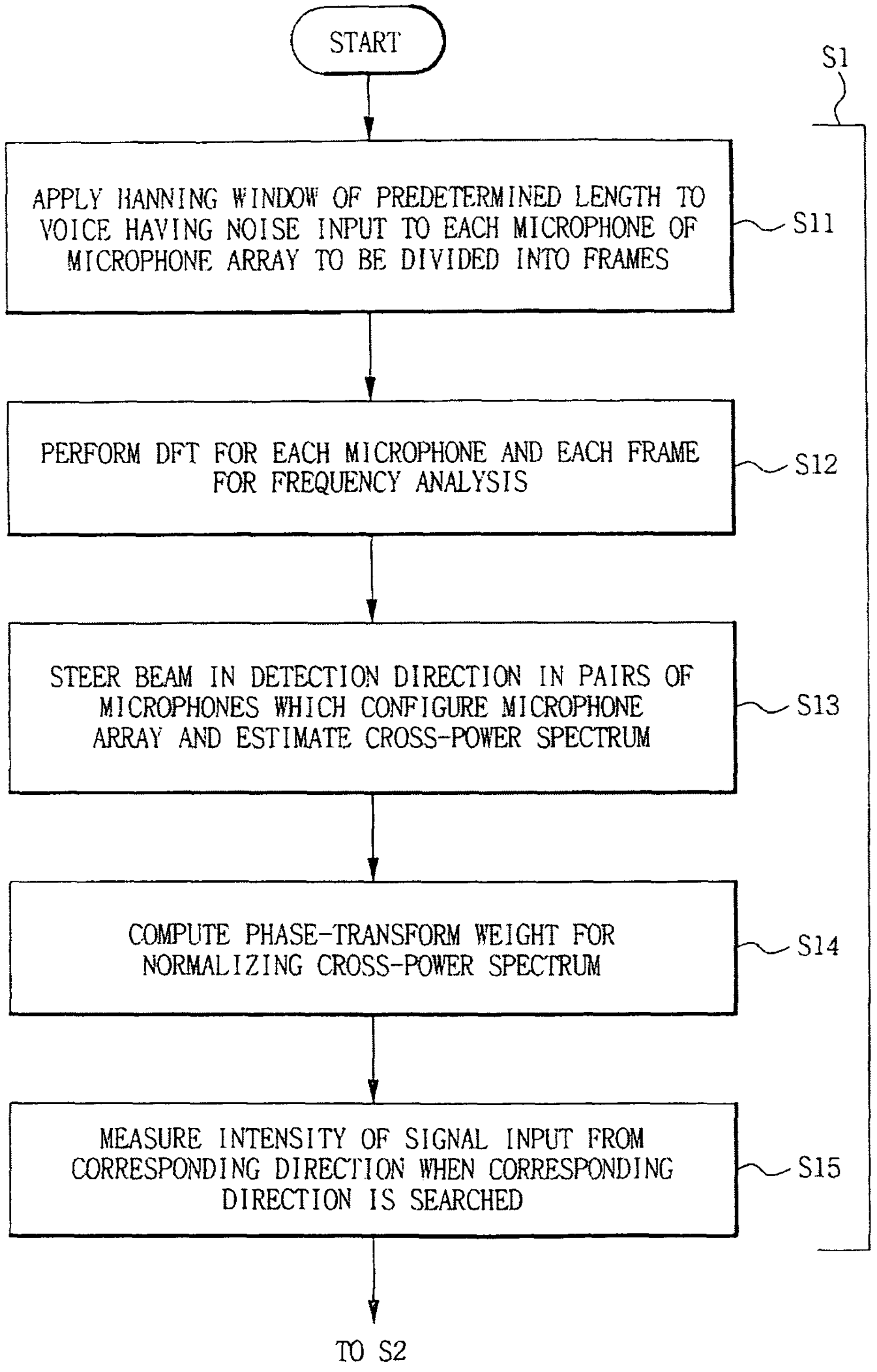
FIG. 6 illustrates a flowchart for a detailed process of detecting signal intensity in an adaptive mode control method for adaptive beamforming based on detection of a user direction sound according to an exemplary embodiment of the present invention.

A process (S1) of detecting signal intensity having a maximum value will be described in detail with reference to FIG. 6.

First, a Hanning window of a predetermined length is applied to a voice having noise input to each microphone to be divided into frames (S11).

A DFT is performed for each microphone 10 and each frame for frequency analysis (S12).

Then, a beam is steered in a detection direction in pairs of microphones which configures a microphone array, and then a cross-power spectrum is estimated (S13).

A phase-transform weight for normalizing a cross-power spectrum is obtained (S14).

Then, when a direction is searched, intensity of a sound input from a corresponding direction is measured (S15).

Subsequently, it is determined whether or not detected signal intensity having a maximum value exceeds a threshold value (S2).

When it is determined in step S2 that the signal intensity having the maximum value exceeds the threshold value (Yes), the adaptive beamforming processor 40 is inhibited from performing an adaptive mode of the GSC (S3).

However, when the signal intensity having the maximum value does not exceed the threshold value, the adaptive mode of the GSC is performed through the adaptive beamforming processor 40.

As described above, according to an adaptive mode control apparatus and method for adaptive beamforming based on detection of a user direction sound according to an exemplary embodiment of the present invention, a lack of control over adaptation of an adaptive filter of the conventional art is solved. That is, according to an exemplary embodiment of the present invention, as one condition for improving reliability of the performance of adaptive beamforming, adaptation of an adaptive filter is not performed when noise of a sound with high autocorrelation is canceled.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An adaptive mode control apparatus for adaptive beamforming based on detection of a user direction sound, comprising:

a signal intensity detector configured to search for signal intensity of each designated direction to detect signal intensity having a maximum value when a voice signal of each direction is input through at least one microphone; and an adaptive mode controller configured to compare the signal intensity having the maximum value detected through the signal intensity detector with a threshold value and determine whether to perform an adaptive mode of a Generalized Sidelobe Canceller (GSC) according to results of the comparison.

2. The adaptive mode control apparatus of claim 1, wherein the signal intensity detector comprises:

a window processor configured to apply a Hanning window of a predetermined length to a voice having noise input to each microphone of a microphone array to be divided into frames;

a Discrete Fourier Transform (DFT) processor configured to apply a DFT for each microphone and each frame for frequency analysis of the frames divided by the window processor;

a correlation computer configured to steer a beam in a detection direction in pairs of microphones which configures the microphone array and estimates a cross-power spectrum;

a weight estimator configured to compute a phase-transform weight for normalizing a cross-power spectrum from a frame output through the DFT processor; and a signal intensity measuring unit configured to measure intensity of a sound input from microphones which configures the microphone array from a corresponding direction for detecting a voice signal.

3. The adaptive mode control apparatus of claim 1, wherein the adaptive mode controller determines not to perform the adaptive mode of the GSC when the signal intensity having the maximum value exceeds the threshold value and determines to perform the adaptive mode of the GSC when the signal intensity having the maximum value does not exceed the threshold value.

4. The adaptive mode control apparatus of claim 3, wherein it is determined before adaptive beamforming processing whether to perform the adaptive mode of the GSC.

5. The adaptive mode control apparatus of claim 3, further comprising, a fixed beamformer configured to steer the microphones which configure the microphone array to a user direction;

a signal blocking unit configured to compute a side-lobe noise input through the microphones that configure the microphone array; and an adaptive filter configured to cancel a directional noise using a signal blocking output value that is computed by adaptively estimating a spatial path transfer function.

6. The adaptive mode control apparatus of claim 5, wherein an average value of user voice signals input from the front through the microphones of the microphone array is computed through the fixed beamformer using the following Equation:

$$Z^{fb}(k,l)=\frac{1}{4}\sum_{i=1}^{4}Z_i^{aec}(k\cdot l),$$

where $Z^{fb}$ denotes a fixed beamformer output, k denotes a discrete frequency index, l denotes a frame index, $Z^{aec}$ denotes an echo-canceled signal, and i denotes a microphone index.

7. The adaptive mode control apparatus of claim 5, wherein the side-lobe noise computed through the signal blocking unit is a side-lobe noise in which a front sound is canceled and only noise is acquired using the following Equation:

$$\begin{bmatrix} Z_1^{sb}(k,l) \\ Z_2^{sb}(k,l) \\ Z_3^{sb}(k,l) \end{bmatrix} = \begin{bmatrix} 1 & -1 & 0 & 0 \\ 0 & 1 & -1 & 0 \\ 0 & 0 & 1 & -1 \end{bmatrix} \begin{bmatrix} Z_1^{aec}(k,l) \\ Z_2^{aec}(k,l) \\ Z_3^{aec}(k,l) \\ Z_4^{aec}(k,l) \end{bmatrix},$$

where $Z^{sb}$ is a signal blocking output, $Z^{aec}$ an echo-canceled signal, k denotes a discrete frequency index, and l denotes a frame index.

8. The adaptive mode control apparatus of claim 5, wherein a length of the Hanning window applied through the window processor is 256 milliseconds (ms).

9. An adaptive mode control method for adaptive beamforming based on detection of a user direction sound, comprising:

searching for signal intensity of each designated direction to detect signal intensity having a maximum value when an array input signal input through at least one microphone that is provided to a fixed beamformer and a signal blocking unit is received;

comparing the detected signal intensity having the maximum value with a threshold and determining whether to perform an adaptive mode of a GSC according to results of the comparison.

10. The adaptive mode control method of claim 9, wherein searching for signal intensity of each designated direction to detect signal intensity having a maximum value comprises:

at a window processor, applying a Hanning window of a predetermined length to a voice having noise input to each microphone of a microphone array to be divided into frames;

at a DFT processor, performing a DFT: for each microphone and each frame for frequency analysis;

at a correlation computer, steering a beam in a detection direction in pairs of microphones which configure the microphone array and estimating a cross-power spectrum;

at a weight estimator, computing a phase-transform weight for normalizing a cross-power spectrum from the frame output through the DFT processor; and measuring intensity of a sound input through the microphones which configure the microphone array from a corresponding direction when the directions of the microphones which configure the microphone array are searched.

11. The adaptive mode control method of claim 9, wherein in determining whether to perform the adaptive mode, it is determined that the adaptive mode of the GSC is not performed when the signal intensity having the maximum value exceeds the threshold value, and it is determined that the adaptive mode of the GSC is performed when the signal intensity having the maximum value does not exceed the threshold value.

12. The adaptive mode control method of claim 9, wherein it is determined before adaptive beamforming processing whether to perform the adaptive mode of the GSC.

13. The adaptive mode control method of claim 9, wherein at a fixed beamformer, steering the microphones which configures the microphone array to a user direction comprises, at the fixed beamformer, computing an average value of user voice signals input from the front through the microphones of the microphone array using the following Equation:

$$Z^{fb}(k,l)=\frac{1}{4}\sum_{i=1}^{4}Z_i^{aec}(k\cdot l),$$

where $Z^{fb}$ denotes a fixed beamformer output, k denotes a discrete frequency index, l denotes a frame index, $Z^{aec}$ denotes an echo-canceled signal, and i denotes a microphone index.

14. The adaptive mode control method of claim 9, further comprising, at a fixed beamformer, steering the microphones which configures the microphone array to a user direction;

at a signal blocking unit, computing a side-lobe noise; and at an adaptive filter, canceling a directional noise using a signal blocking output value that is computed by adaptively estimating a spatial path transfer function.

15. The adaptive mode control method of claim 14, wherein at a signal blocking unit, computing a side-lobe noise comprises computing a side-lobe noise in which a front sound is canceled and only noise is acquired using the following Equation:

$$\begin{bmatrix} Z_1^{sb}(k,l) \\ Z_2^{sb}(k,l) \\ Z_3^{sb}(k,l) \end{bmatrix} = \begin{bmatrix} 1 & -1 & 0 & 0 \\ 0 & 1 & -1 & 0 \\ 0 & 0 & 1 & -1 \end{bmatrix} \begin{bmatrix} Z_1^{aec}(k,l) \\ Z_2^{aec}(k,l) \\ Z_3^{aec}(k,l) \\ Z_4^{aec}(k,l) \end{bmatrix},$$

where $Z^{sb}$ is a signal blocking output, $Z^{aec}$ an echo-canceled signal, k denotes a discrete frequency index, and l denotes a frame index.

16. A system for adaptive beamforming, the system comprising an adaptive mode control apparatus configured to perform adaptive beamforming based on detection of a user direction sound, the adaptive mode control comprising:

a signal intensity detector configured to search for signal intensity of each designated direction to detect signal intensity having a maximum value when a voice signal of each direction is input through at least one microphone; and an adaptive mode controller configured to compare the signal intensity having the maximum value detected through the signal intensity detector with a threshold value and determines whether to perform an adaptive mode of a Generalized Sidelobe Canceller (GSC) according to results of the comparison.

17. The system of claim 16, wherein the signal intensity detector comprises:

a window processor that applies a Hanning window of a predetermined length to a voice having noise input to each microphone of a microphone array to be divided into frames;

a Discrete Fourier Transform (DFT) processor that performs a DFT for each microphone and each frame for frequency analysis of the frames divided by the window processor;

a correlation computer that steers a beam in a detection direction in pairs of microphones which configures the microphone array and estimates a cross-power spectrum;

a weight estimator that computes a phase-transform weight for normalizing a cross-power spectrum from a frame output through the DFT processor; and a signal intensity measuring unit that measures intensity of a sound input from microphones which configures the microphone array from a corresponding direction for detecting a voice signal.

18. The system of claim 16, wherein the adaptive mode controller determines not to perform the adaptive mode of the GSC when the signal intensity having the maximum value exceeds the threshold value and determines to perform the adaptive mode of the GSC when the signal intensity having the maximum value does not exceed the threshold value.

19. The system of claim 18, wherein it is determined before adaptive beamforming processing whether to perform the adaptive mode of the GSC.

20. The system of claim 18, further comprising, a fixed beamformer that steers the microphones which configure the microphone array to a user direction;

a signal blocking unit that computes a side-lobe noise input through the microphones that configure the microphone array; and an adaptive filter that cancels a directional noise using a signal blocking output value that is computed by adaptively estimating a spatial path transfer function.

* * * * *